United States Patent
Knoop

(10) Patent No.: US 7,107,045 B1
(45) Date of Patent: Sep. 12, 2006

(54) METHOD AND SYSTEM FOR DISTRIBUTION OF MEDIA

(75) Inventor: Dale Knoop, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 554 days.

(21) Appl. No.: 10/308,940

(22) Filed: Dec. 3, 2002

(51) Int. Cl.
*H04M 3/42* (2006.01)

(52) U.S. Cl. .............................. 455/414.1; 455/426.1; 455/412.1; 455/556.1

(58) Field of Classification Search .................... None
See application file for complete search history.

(56) References Cited

U.S. PATENT DOCUMENTS 5,303,393 A * 4/1994 Noreen et al. ............. 455/3.02
6,628,928 B1 * 9/2003 Crosby et al. ................ 455/77
2003/0221127 A1 * 11/2003 Risan et al. ................ 713/201

* cited by examiner

*Primary Examiner*—Temica Beamer

(57) ABSTRACT

A method and system for playing a media sample representing a full media selection on a wireless handset and, in turn, requesting the full media selection to be sent to a client station other than the wireless handset. The method and system provides for a user of a wireless handset to receive one or more media samples from a media content provider, such as a media server. The user can then request one or more full media selections from the media server, and the media server can, in turn, e-mail to the user a hyperlink for each full media selection selected by the user. The user can then invoke the hyperlink to access a full media selection at a client station other than the wireless handset.

27 Claims, 6 Drawing Sheets

METHOD AND SYSTEM FOR DISTRIBUTION OF MEDIA

BACKGROUND

1. Field of the Invention

The present invention relates to distribution of media, such as music or video, for instance. More specifically, it enables a user to sample media at a wireless handset, such as a mobile station, and, if desired, to then receive a full version of the media at another computing device. Further, the user might elect to receive the full version of the media through a less-expensive distribution channel such as a networked personal computer.

2. Description of the Related Art

A wireless handset, such as a mobile station, can receive media content from a media content provider by connecting to a media server. Once connected to the media server, the wireless handset might receive media content from the media server. For example, the wireless handset might receive a video file that the wireless handset can play on its display screen. Simultaneously, the wireless handset might receive audio that the wireless handset can play on an audio speaker and that accompanies the video file. The media server might also send other media content, such as audio-only files, still images, or video games, for example, to the wireless handset. The wireless handset might play media content using a media player application.

It may not always be desirable or cost-effective, however, to send entire media content, for example, an entire song, to the wireless handset. It can be time consuming and/or expensive for a user to receive entire media content at a wireless handset. Further, a user might not find it convenient to receive entire media content at that user's wireless handset.

Thus, there exists a need to provide a better way to select and receive media content.

SUMMARY

An exemplary embodiment enables a user to sample media content at a wireless handset, such as a mobile station, and, if desired, to then receive a full version of the media content at another computing device. The specification and claims will refer to a computing device that receives a full version of media content as a "client station."

According to the exemplary embodiment, a user will first operate a wireless handset (e.g., a third generation ("3G") mobile station) to receive a media sample. For instance, the user might navigate to a wireless web site that allows the user to select from a menu of various media samples (e.g., the latest song releases or news stories), and a media server might then send a selected sample to the user's handset. The media server might stream the sample, send the sample as a bulk data file, or send the sample to the wireless handset in another way. In any case, the sample might represent a full version of the media content.

In turn, through use of the wireless handset, the user might signal to a server (e.g., the media server) that the user wants to receive (and, preferably, agrees to pay for) the full version of the media, as represented by the sample. In doing so, the user could provide the server with an e-mail address to which the server should send a hyperlink to the full version. Alternatively, the server might already have a stored indication of an e-mail address to which the server should send the hyperlink.

The server might then send to the user at the designated e-mail address a hyperlink to the full version of the media. For instance, the server might send an e-mail to the user and include the hyperlink in the message body. The user might then retrieve the e-mail at a client station other than the user's wireless handset. And the user might then click on the hyperlink to invoke or to cause a media server to send the full version of the media to that client station. The media server might stream the full version of the media, send the full version of the media as a bulk data file, or send the full version of the media to the client station in another way.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Terminology

Terms such as "computer," "computing device," and "computer system," and related terms used in this specification and claims are to be construed broadly to encompass any computing device or combination of computing devices. In addition, the term "media" is to be construed broadly to encompass, for example, audio, video, text, speech, and video games or gaming, or any combination thereof. Other examples of "media" are possible as well.

2. Overview of Exemplary Embodiment

Figure 1:
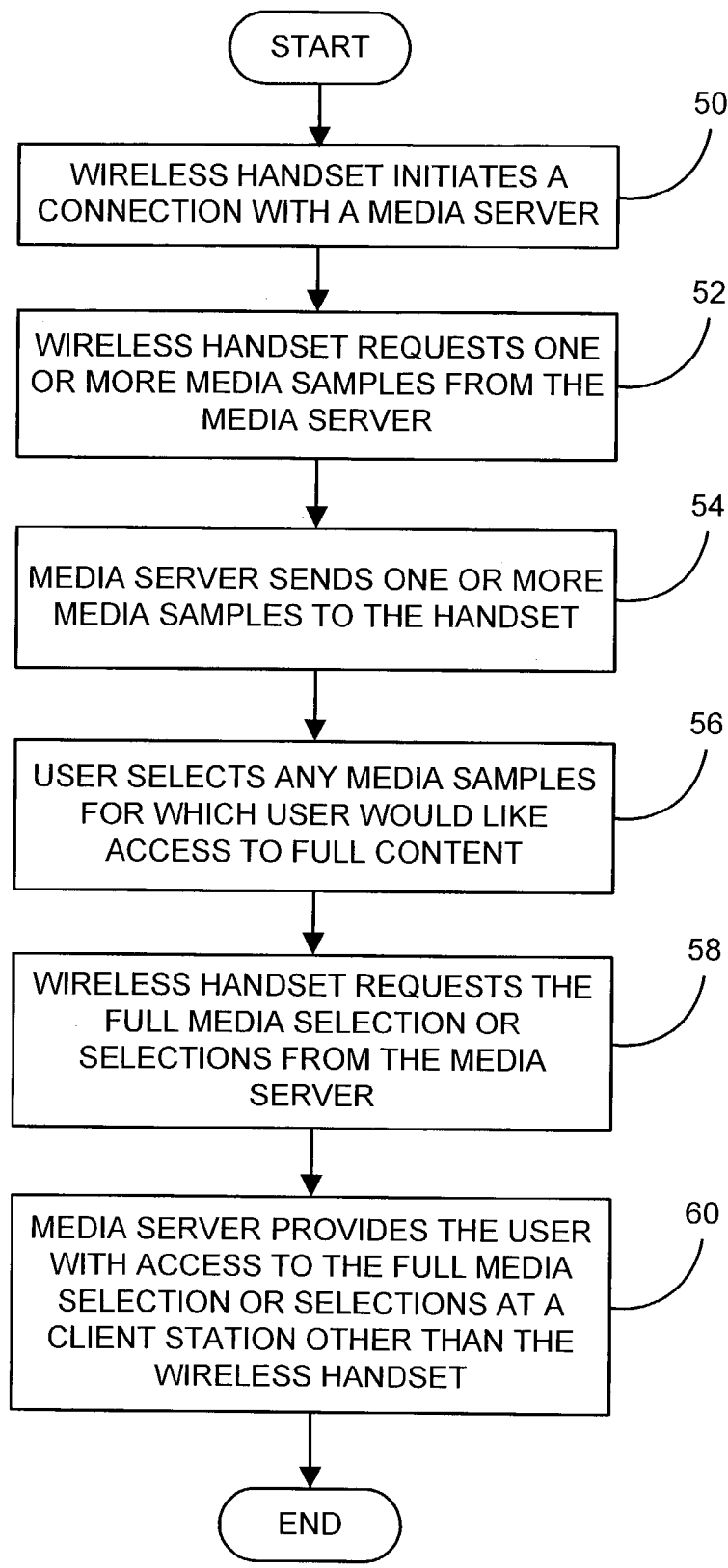
FIG. 1 is a flowchart illustrating a process carried out by a computer system in accordance with an exemplary embodiment.

Referring to the drawings, FIG. 1 is a flow chart of a process carried out in accordance with an exemplary embodiment. At block 50, a wireless handset initiates a connection with a media server. Then, at block 52, the wireless handset requests one or more media samples from the media server. At block 54, the media server sends any media samples requested by the wireless handset to the wireless handset. When sending each sample, the media sever might stream the sample or the media server might send the sample as a bulk data file to facilitate playback at a later time.

Then, at block 56, a user might enter into the wireless handset a selection of one or more media samples for which the user wants the full media content. At block 58, the wireless handset requests the full media selection or selections from the media server. Next, at block 60, the media server makes available a full media selection to the user at a client station other than the wireless handset. In an exemplary embodiment, the media server will e-mail to the user a hyperlink that the user can invoke to cause a server to send a full media selection to the client station. The media sever might stream the full media selection or the media server might send the full media selection as a bulk data file to facilitate playback at a later time.

3. Exemplary Architecture

Figure 2:
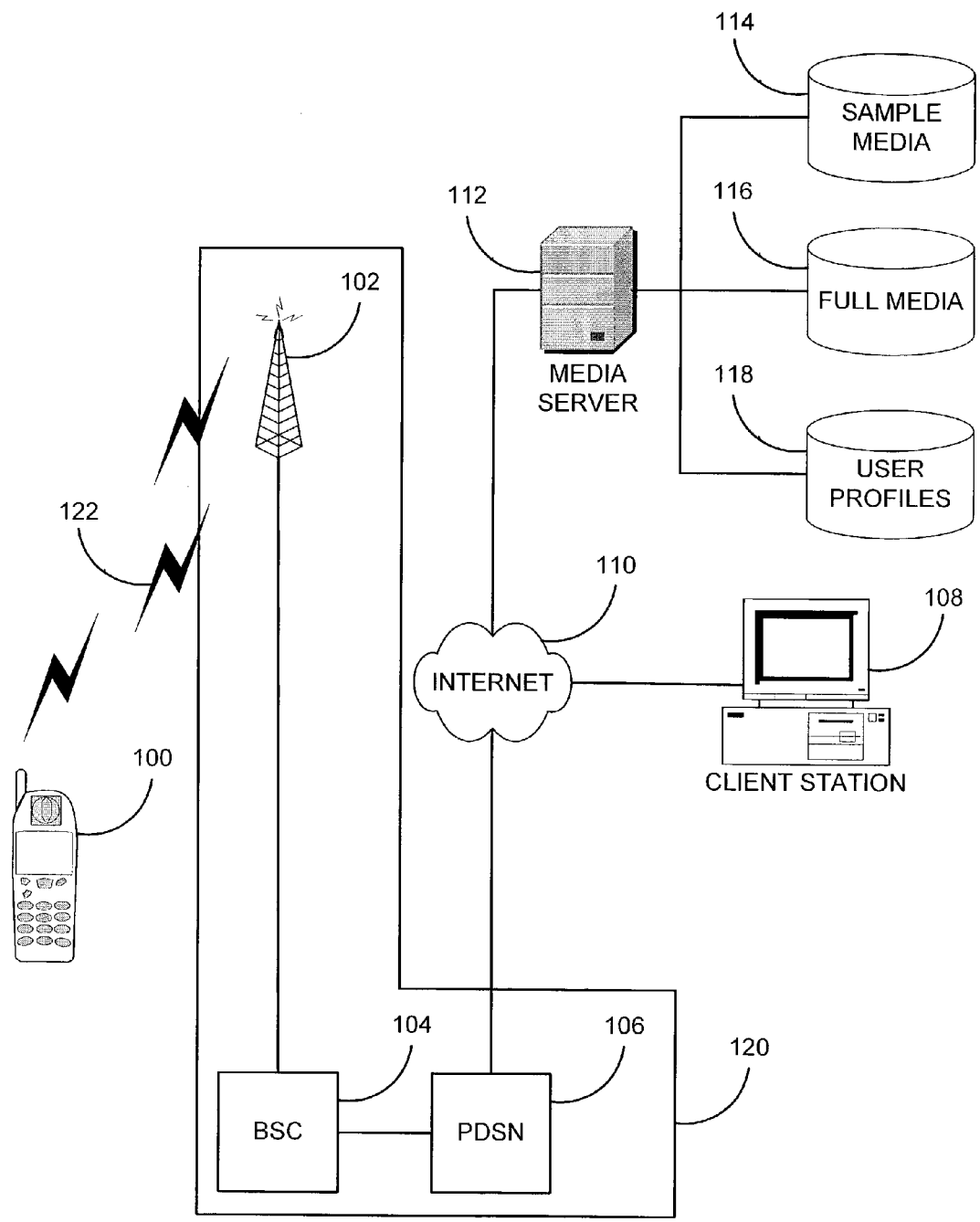
FIG. 2 is a block diagram of an exemplary architecture in accordance with an exemplary embodiment.

FIG. 2 shows an exemplary architecture for facilitating communication between a wireless handset 100, a media server 112, and a client station 108. It should be understood, however, that this and other arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, those skilled in the art will appreciate that many of the elements described herein are functional entities that may be implemented as discrete or distributed components or in conjunction with other components, and in any suitable combination and location.

Still further, various functions described herein as being performed by one or more entities may be carried out by hardware, firmware, and/or software logic. For instance, various functions may be carried out by a processor (i.e., one or more processors) executing a set of machine language instructions stored in memory. Provided with the present disclosure, those skilled in the art can readily prepare appropriate computer instructions to perform such functions.

As shown in FIG. 2, the wireless handset 100, media server 112, and the client station 108 might connect to and communicate with each other through the Internet 110. For example, the wireless handset 100 might wirelessly connect to a wireless telecommunications network ("wireless network") 120, such as a cellular network, which can comprise a base station 102, a base station controller ("BSC") 104, and a packet data serving node ("PDSN") 106. The wireless network 120 might connect to the Internet 110. A client station 108 and a media server 112 might also connect to the Internet 110. In an exemplary embodiment, the media server 112 might communicate with a sample media database 114, a full media database 116, and a user profile database 118. In another embodiment, the data in these three databases might reside in one database. In yet another embodiment, the data in these three databases might reside on a data storage medium in the media server. Other examples are possible as well.

Figure 3:
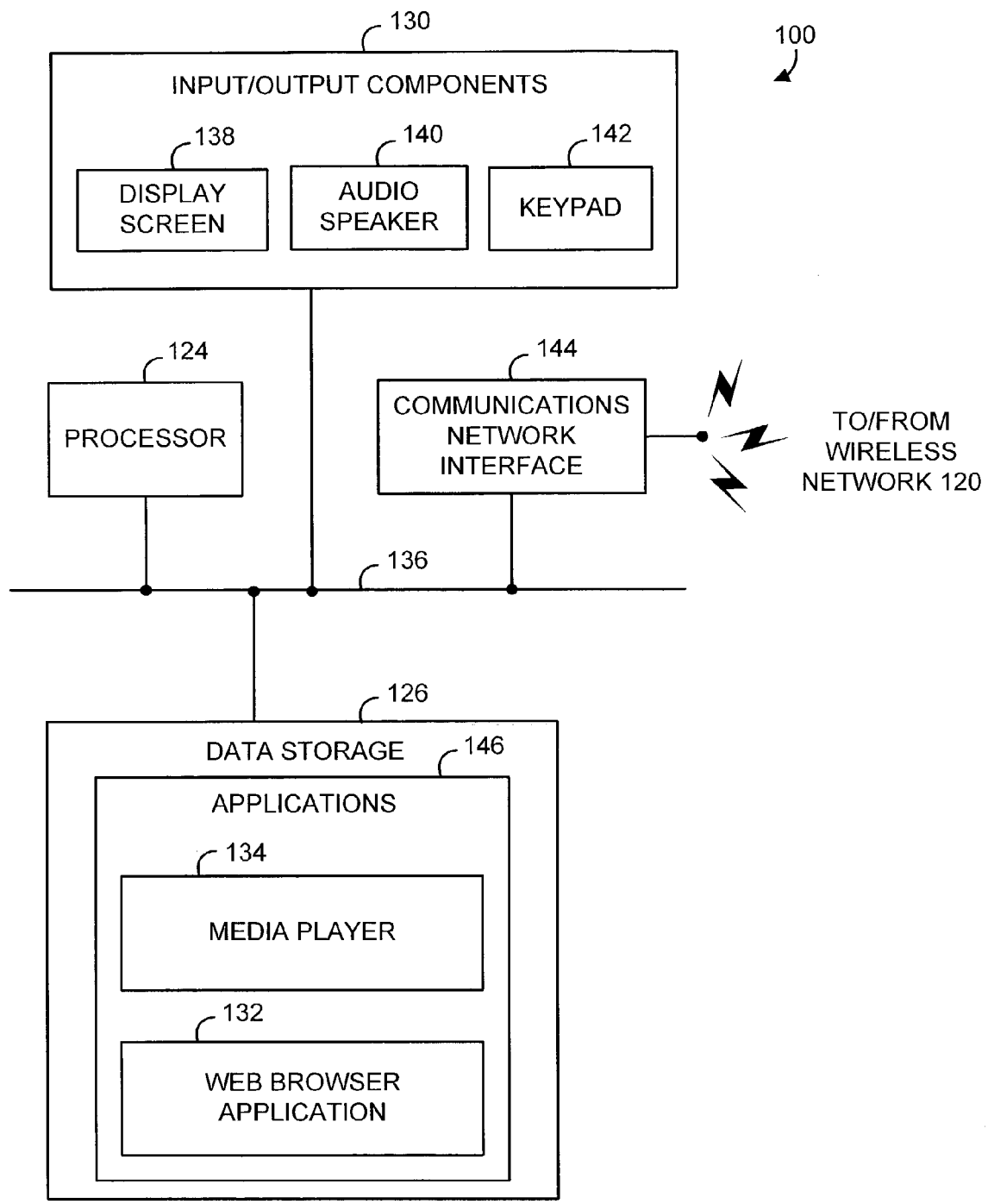
FIG. 3 is a block diagram illustrating exemplary components of a wireless handset.

FIG. 3 is a block diagram showing some of the components of an exemplary wireless handset 100. The wireless handset 100 may be any device that can wirelessly receive media content. In an exemplary embodiment, for instance, the wireless handset 100 is a 3G (or later) mobile station. In other embodiments, the wireless handset 100 might be a personal digital assistant ("PDA") that is capable of receiving wireless communications or a personal computer that is capable of receiving wireless communications. Still other examples of wireless handsets are possible as well.

As shown in FIG. 3, an exemplary wireless handset 100 might include a processor 124, data storage 126, and machine language instructions stored in the data storage 126 and executable by the processor 124 to perform various functions described herein. The machine language instructions might define applications 162 that might also be stored in the data storage 126. The wireless handset 100 might also comprise a wireless network interface component 144 through which the wireless handset 100 can communicate with a wireless network 120. Further, the wireless handset 100 might comprise input and output components 130. The various components of the wireless handset 100 (including the processor 124, the data storage 126, the wireless network interface 144, and the input and output components 130) might be coupled together directly or via a system bus 136, for instance. Other arrangements are possible as well.

As shown by way of example in FIG. 3, the input and output components 130 might comprise a display screen 138, an audio speaker 140, and a keypad 142. The wireless handset 100 might also comprise other or additional input or output components, and the wireless handset 100 might also have fewer input or output components than that shown in FIG. 3. In an exemplary embodiment, the wireless handset 100 might have multimedia capabilities such as an ability to display video and play audio. In other embodiments, however, the wireless handset 100 might be capable of only playing audio or of only displaying video, or it might be limited in some other way.

Applications 146 might be stored in the data storage 126 and executed by the processor 124. In an exemplary embodiment and as shown in FIG. 3, the data storage 126 might contain a media player application ("media player") 134 and a web browser application 132. The applications 146 might utilize the various input and output components 130 of the wireless handset 100 and, thereby, interact with the user. For example, an application might output video on the display screen 138, it might play audio on the speaker 140, it might receive input from the keypad 142, or it might perform a combination of these or other actions.

The media player 134 might be suitable to present media content that the media sever 112 might send to the wireless handset 100. The media player 134 might be an industry standard MP3 audio and/or MPEG video player, or other such players supporting media encoding now known or later developed. A wireless handset 100 might support more than one media player, and a user may add or remove media players from the wireless handset 100.

The web browser application 132 might be an application suitable for connecting to and transferring data with the media server 112. For example, the web browser might be an OpenWave™ Microbrowser web browser. Other examples are also possible.

Referring to FIG. 2, the wireless handset 100 might communicate with the media server 112 over the Internet 110. In other embodiments, the wireless handset 100 might communicate with the media server 112 over another public or private network. In an exemplary embodiment, the wireless handset 100 might connect to the Internet via a wireless network 120 that might provide telecommunications service to the wireless handset 100. The wireless handset 100 might communicate with the wireless network 120 through the network interface 144.

In an exemplary embodiment, the wireless network 120 might provide an air interface 122 for coupling with the wireless handset 100. In particular, the air interface 122 might link the wireless handset 100 to the base station 102.

In the arrangement of FIG. 2, the wireless handset 100 might communicate with the base station 102 using any of a variety of different protocols. For instance, the wireless handset 100 might communicate with the base station 102 using Code Division Multiple Access ("CDMA"). CDMA provides a method for sending wireless signals between the wireless handset 100 and the base station 102. In a CDMA system, the base station 102 communicates with the wireless handset 100 over a spread spectrum of frequencies. Typical components for CDMA systems include those described in the Telecommunications Industry Association ("TIA") standard, ANSI/TIA/EIA-95-B-99, dated Feb. 3, 1999, which is incorporated herein by reference in its entirety. Time Division Multiple Access ("TDMA") is another popular method for wireless communications. In TDMA systems, the base station 102 typically communicates on a group of frequencies, and each frequency may itself carry at least one multiplexed call. The Global System for Mobile Communications ("GSM") or another method may also be used.

The base station 102 might be coupled to the BSC 104. The BSC 104 might, in turn, connect with the PDSN 106 and the PDSN 106 might provide connectivity to a packet-switched network, such as the Internet 110. Once the wireless handset 100 connects to the Internet 110 through the wireless network 120, it can exchange data with other devices also connected to the Internet 110, including the media server 112, for instance.

Figure 4:
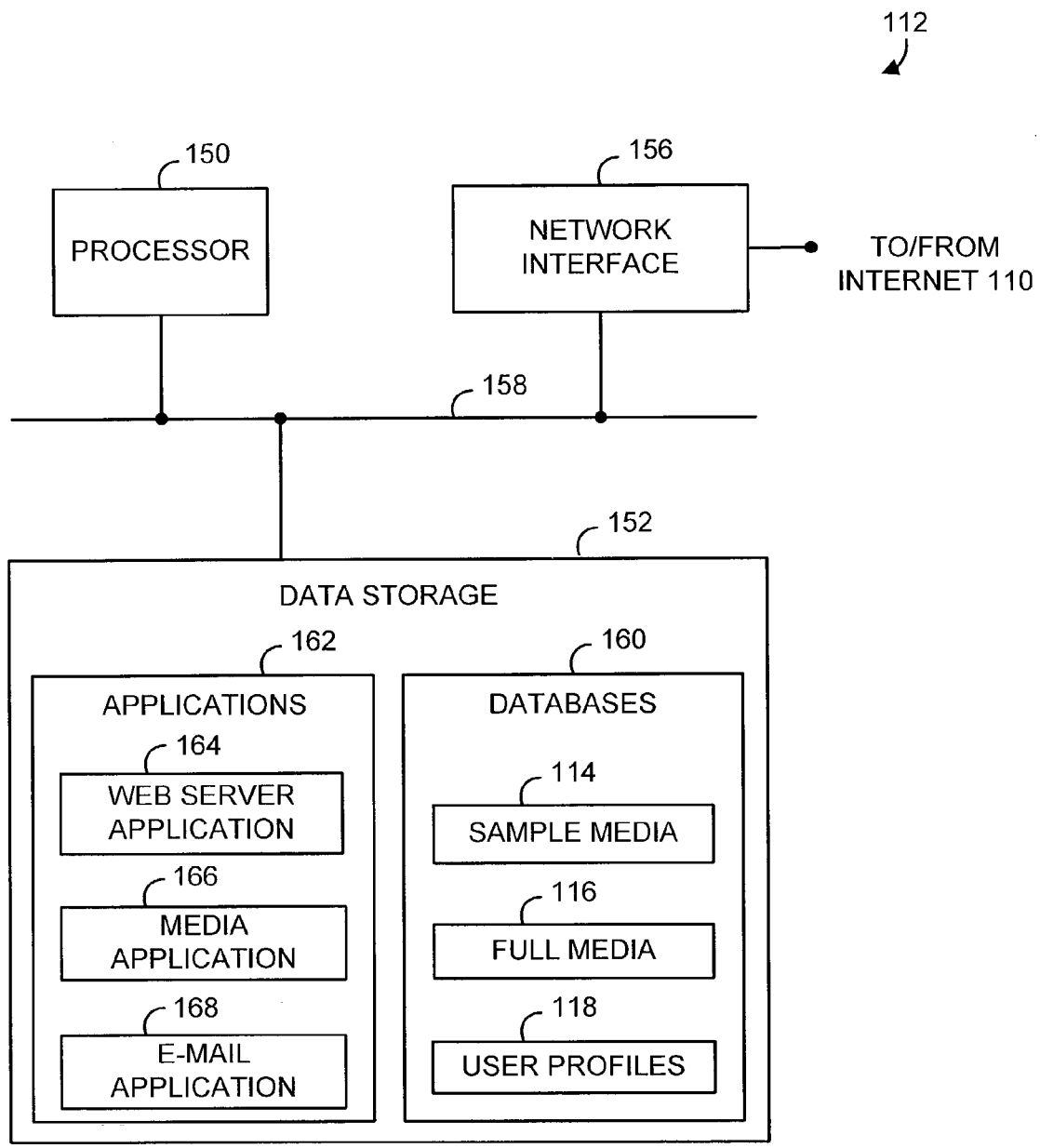
FIG. 4 is a block diagram illustrating exemplary components of a media server.

FIG. 4 is a block diagram showing some of the components of an exemplary media server 112. The media server 112 may be any computing device capable of sending media content. In an exemplary embodiment, for instance, the media server 112 might be a server class computer.

As shown in FIG. 4, an exemplary media server 112 might include a processor 150, data storage 152, and machine language instructions stored in the data storage 152 and executable by the processor 150 to carry out various functions described herein. The machine language instructions might define applications 162 that might also be stored in the data storage 152. The media server 112 might also comprise a network interface component 156 through which the media server 112 might communicate with the Internet 110, for instance. The various components of the media server 112 (including the processor 150, the data storage 152, and the network interface 156) might be coupled together directly or via a system bus 158, for instance. Other arrangements are possible as well.

The data storage 152 of media server 112 might include any number of databases 160 (or other files of information) for facilitating the selection and distribution of media content. In an exemplary embodiment, the data storage 152 might include (i) a sample media file database 114, (ii) a full media file database 116, and (iii) a user profile database 118. Other database arrangements are possible. For example, the sample media database 114 and the full media database 116 might be combined and/or there might not be a user profile database 118. In another example, information for facilitating the selection and distribution of media content might be combined into one database or file.

An exemplary sample media database 114 might include a plurality of records, and each record might comprise an identification of a media sample as well as data representing the media sample. Likewise, an exemplary full media database 116 might also include a plurality of records, and each record might comprise an identification of a full media file as well as data representing the full media file. In another embodiment, the sample media database 114 and the full media database 116 might be combined such that each database record might comprise an identification of the media content, data representing the sample media file, and data representing the full media file. In yet another embodiment, each instance of media might be stored as a file in the data storage 152 and might not correspond to a record in a database. Other examples or arrangements are possible as well.

An exemplary user profile database 118 might include a plurality of records, and each record might correspond to a user who might request media content. The records in an exemplary user profile database 118 might comprise information related to each particular user, such as user preferences and user e-mail addresses. Other examples or arrangements are possible as well.

In an exemplary embodiment, the data storage 152 might reside on the media server 112. In other embodiments, some or all of the data in data storage 152, including some or all of the data in the databases 160, might reside on other devices. For instance, the exemplary embodiment of FIG. 2 shows the sample media database 114, the full media database 116, and the user profile database 118 each residing on a separate database server. In such a case, each data storage device might communicate with the media server 112 via a link such as a T1, IEEE 488, or Ethernet link, for example.

In an exemplary embodiment, a given instance of media content (either a media sample or a full media selection) might be stored as one or more files in the media server's data storage 154 (for example, in the sample media database 114 or the full media database 116). The media server 112 might send the data representing the media content to the wireless handset 100 or the client station 108 at a high bit rate, a low bit rate, or other specific bit rates. The media server 112 might send the media content as video only, audio only, video plus audio, or periodic stills plus audio. Other examples are possible as well.

The media server 112 might send each instance of media content in one or more different encoded formats. The wireless handset 100 or client station 108 that receives the media content might then have a decoder for each format, to facilitate decoding the underlying information representing the media content. Once decoded, the wireless handset 100 or the client station 108 can play the media content. Examples of common formats include JPEG, MPEG, and MP3, but many other formats for media content are available, and these might also be used.

The data storage 152 might also comprise applications 162, which might include a web server application 164, a media application 166, and an e-mail application 168. In other embodiments, the functionalities of each of the web server application 164, the media application 166, and the e-mail application 168 might be combined into the same application, or any number of different applications, and could, alternatively, reside on separate network components.

In an exemplary embodiment, the web server application 164 generally might allow users to interact with the media server 112 from computing devices such as wireless handset 100 or client station 108. For example, a user might use a web browser application 132 on the wireless handset 100 to access the web server application 164 and view available media content on media server 112. The web server application 164 might support other methods of access, as well.

In an exemplary embodiment, the media application 166 might send media files from the media server 112 to another device, such as the wireless handset 100 or the client station 108. The media application might send media files as bulk data files. In such a case, a device receiving a media file might download each file and play it back at a later time. In another embodiment, the media application might stream media files. In such a case, a device receiving a media file might play out the file as it receives the file. Other examples are possible as well.

In an exemplary embodiment, the e-mail application 168 might send to a user a message that includes a hypertext link. The user might then invoke that hyperlink at a client station 108, and the media server 112 might responsively send to that user media content using the media application 166.

The media server 112 might connect to the Internet 110 through a local area network ("LAN"). The media server 112 might connect to the LAN using a network interface 156, such as a network interface card ("NIC"), and the LAN, in turn, might provide connectivity to the Internet 110 through an Internet Service Provider ("ISP") or another gateway. Alternatively, the media server 112 might connect to a private intranet (e.g., a core packet network of a wireless service provider) or to another network that provides connectivity to the Internet 110. Further, the media server 112 might connect directly to the Internet 110 without connecting through a LAN. The media server 112 might also wirelessly connect to the Internet 110.

Figure 5:
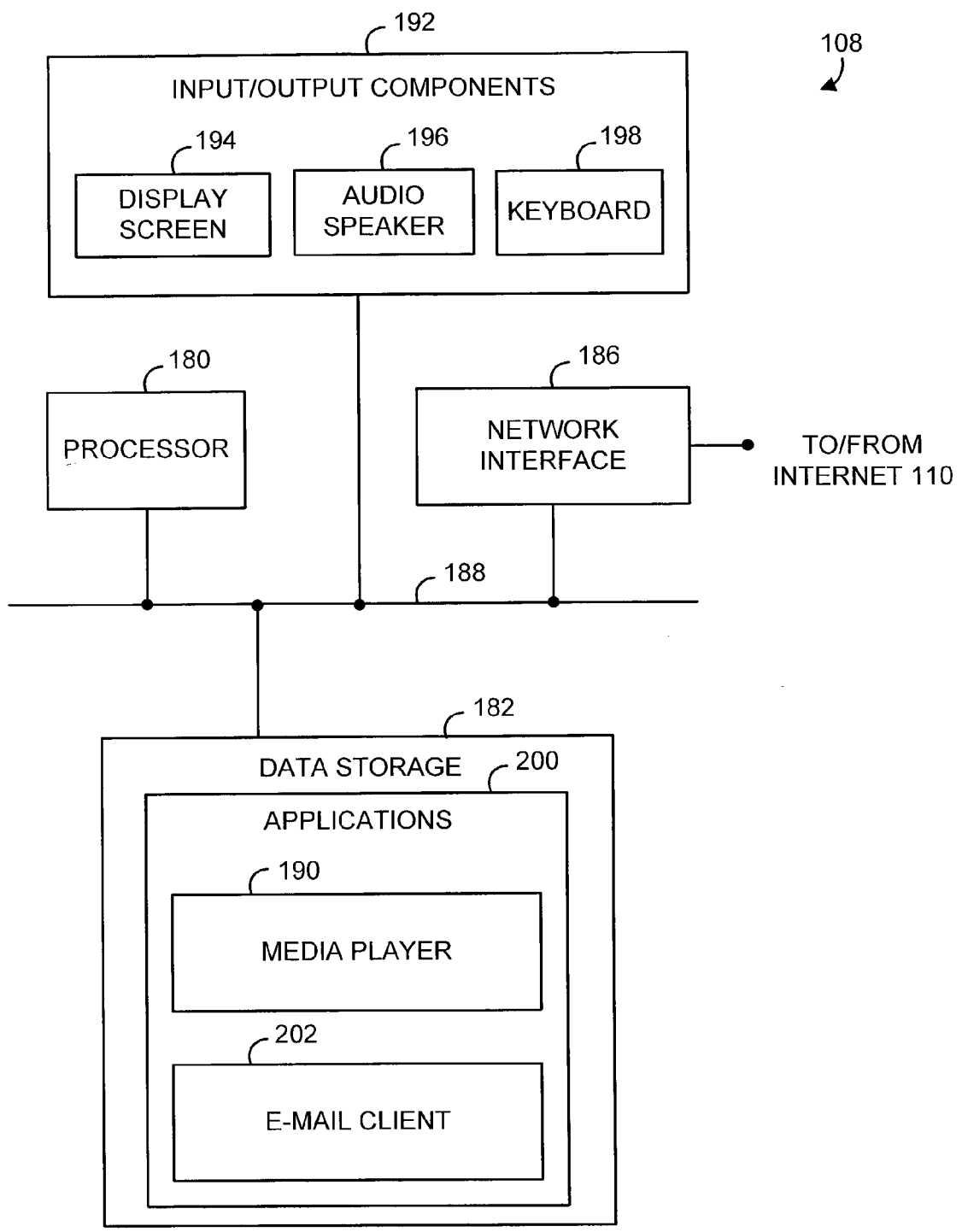
FIG. 5 is a block diagram illustrating exemplary components of a client station.

FIG. 5 is a block diagram showing some of the components of an exemplary client station 108. The client station 108 may be any computing device, other than the wireless handset 100, that is capable of receiving and playing media content.

As shown in FIG. 5, an exemplary client station 108 might include a processor 180, data storage 182, and machine language instructions stored in the data storage 182 and executable by the processor 180 to carry out various functions described herein. The machine language instructions might define applications 200 that might also be stored in the data storage 182. The client station 108 might also comprise a network interface component 186 through which the client station 108 might communicate with the Internet 110, for instance. Further, the wireless handset 100 might comprise input and output components 192. The various components of the client station (including the processor 180, the data storage 182, the network interface 186, and the input and output components 192) might be coupled together directly or via a system bus 188, for instance. Other arrangements are possible as well.

As further shown in FIG. 5, the input and output components 192 might comprise a display screen 194, an audio speaker 196, and a keyboard 198. The client station 108 might comprise other or additional input or output components, and the client station 108 might also have fewer input or output components 192 than that shown in FIG. 5. In an exemplary embodiment, the client station 108 might have multimedia capabilities such as displaying video and playing audio. In other embodiments, however, the client station 108 might be capable of only playing audio or of only displaying video, or the client station 108 might be limited in some other way.

Applications 200 might be stored in the data storage 182 and executed by the processor 180. In an exemplary embodiment, the data storage 182 might contain an e-mail client 202 and a media player 190. The e-mail client 202 might be any industry standard application that is suitable for receiving e-mails or other messages containing hyperlinks. The media player 190 might be an application suitable to present media content that the media sever 112 might send to the client station 108. The media player 190 might be an industry standard MP3 audio and/or MPEG video player, or other such players supporting media encoding now known or later developed. The client station 108 might support more than one media player, and a user may add or remove media players from the client station 108. Further, the client station 108 might support other applications, such as a web browser application, for instance.

Referring to FIG. 2, the client station 108 and the media server 112 might communicate over the Internet 110. In other embodiments, the client station 108 might communicate with the media server 112 over another public or private network. The client station 108 might connect to the Internet 110 in any number of ways. The client station 108 might use a network interface 156, such as a NIC, to connect to a LAN, for instance. The LAN, in turn, might provide connectivity to the Internet 110 through an ISP or another gateway. Alternatively, the client station 108 might connect to a private intranet or to another network that might provide connectivity to the Internet 110. Further, the client station 108 might connect directly to the Internet 110 without connecting through a LAN. In other embodiments, the client station 108 might also connect to the Internet 110 using a wireless access network.

The foregoing discussion illustrates one exemplary embodiment of a system for communication between a wireless handset 100 and a media server 112 and between a client station 108 and a media server 112. Many variations may be made to the system shown in FIG. 2, and many other systems may also be used. As an example, changes may be made to the configuration of the cellular network. As another example, the media server 112 might interface with the Internet in a different manner. And as yet another example, the wireless handset 100 and the media server 112, or the client station 108 and the media server 112, might reside on the same network, and they might communicate with each other over a path other than the Internet. These examples are not exhaustive, and other variations are also possible.

4. Exemplary Operation

Figure 6:
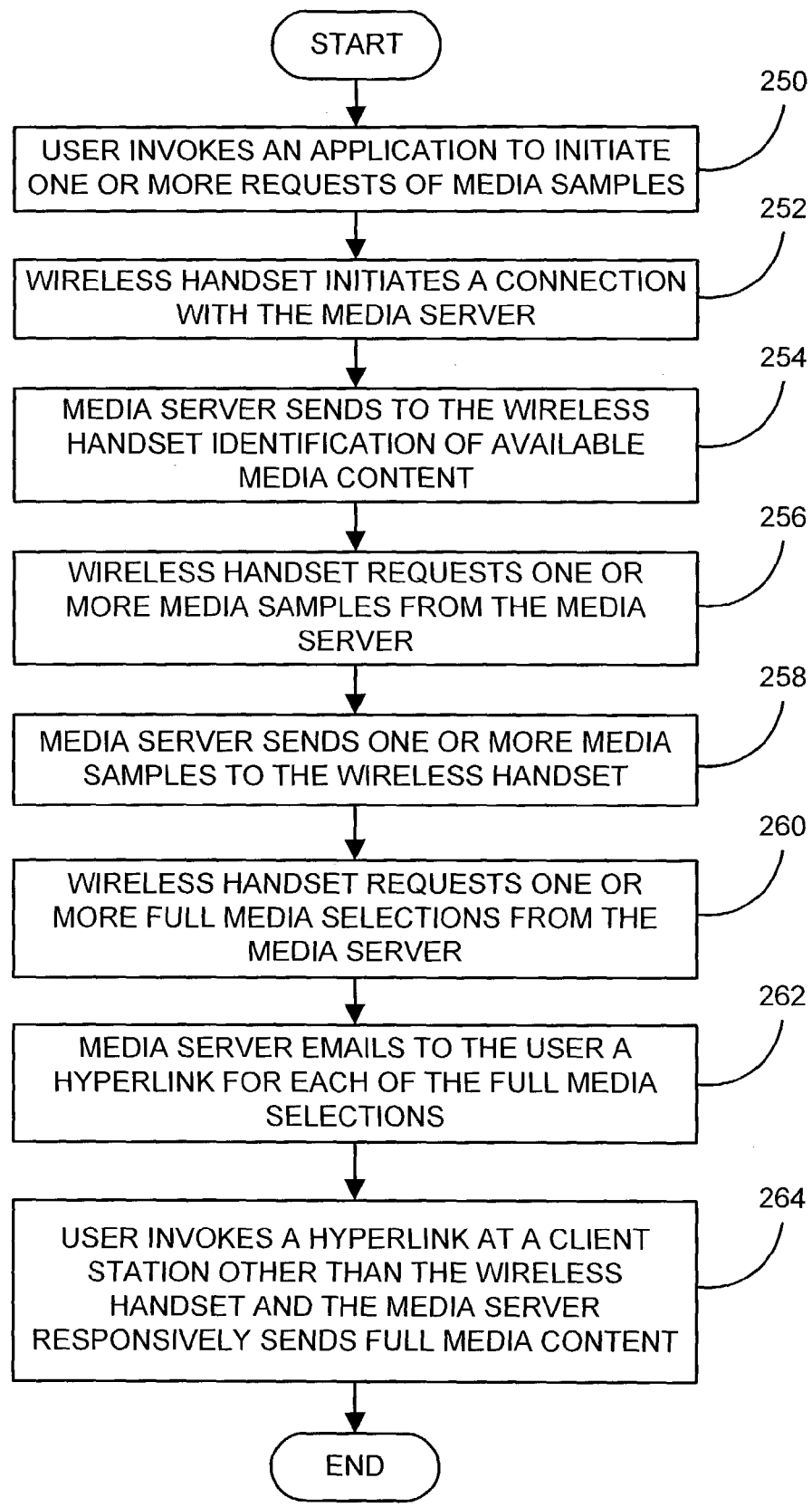
FIG. 6 is a flowchart illustrating one embodiment of a process carried out by a computer system in accordance with an exemplary embodiment.

FIG. 6 is a flowchart that depicts a set of functions that might be involved in selecting one or more media samples from a wireless handset 100 and, in turn, accessing one or more full media selections at a client station 108 other than the wireless handset 100. At block 250, when a user wishes to obtain media content from a media server 112, the user might invoke a suitable application on the wireless handset 100. For instance, the user might start a media player 134, a web browser 132, or another application.

At block 252, the invoked application might then cause the wireless handset 100 to attempt to connect to the media server 112. To connect to the media server 112, the wireless handset 100 might first connect to the wireless handset's wireless network 120, for instance, by communicating with a base station 102, or other access point, in the wireless network 120.

While connection to the wireless network 120 might occur automatically upon starting the application, it might also be established manually by the user or in another way. Alternatively, when a media player 134, a web browser 132, or another application for obtaining media content starts, the wireless handset 100 might already be connected to the wireless network 120. Then, once the application runs, it might use the existing connection to the wireless network 120 to access the Internet 110 and connect to the media server 112.

After the wireless handset 100 connects to the Internet 110, the application might establish a connection and communicate with the media server 112 in a variety of ways. For example, using a microbrowser 132, the user might browse to a web card (the microbrowser analog of an HTML web page) hosted by the web server application 164 on the media server 112. Alternatively, the user might have invoked a different application, such as a media player 134, and the application might use a different method for interfacing with the media server 112. The wireless handset 100 might also interface with the media server 112 without the user having invoked an application.

Once the wireless handset 100 and the media server 112 have established a connection, at block 254, the media server 112 might use one or more different protocol suites (such as TCP/IP or TCP with Mobile IP, for instance) to exchange data with the wireless handset 100. Further, the wireless handset 100 might receive data identifying available media samples from the media server 112. The wireless handset 100 might, in turn, search its data storage 126 for an application to associate with the available media sample file types. And the wireless handset 100 might then associate the media player application 134 with the available media samples.

Further, the microbrowser 132 might display Uniform Resource Locators ("URLs") on the display screen 138, and these URLs might represent the available media samples. A displayed URL might point to the media server 112 handling that particular media sample and might identify the media sample stored on that media server 112. Further, a media sample might comprise several media streams, for example, a media sample might comprise an audio stream and a video stream, and these separate streams might be located on different media servers. For example, audio and video streams might be split across different servers for resource sharing.

At block 256, the wireless handset 100 might request from the media server 112 one or more media samples. A user might initiate the request of a media sample by selecting a URL on the display screen 138 of the wireless handset 100, for instance. The wireless handset 100 might, however, request media content by instructing the media server 112 to access a user profile database 118 and look up a record for a particular user. The user profile can include pre-selections of media samples (such as all news stories related to a certain topic or company, or samples of all new song releases by certain artists, for example).

Then, the media server 112 might send the wireless handset 100 a media sample. In an exemplary embodiment, the media server 112 and the wireless handset 100 might engage in a Real Time Streaming Protocol ("RTSP") session. RTSP is a protocol that controls a media stream, which the media server 112 may send via another protocol, such as Real Time Transport Protocol ("RTP"), for instance. RTSP is described in detail in the Network Working Group Request for Comment 2326, Schulzrinne et al., April 1998, which is incorporated herein by reference in its entirety.

In another embodiment, the wireless handset 100 might send to the media server 112, a standard or proprietary media transfer session initiation request. For instance, the wireless handset 100 might send a Session Initiation Protocol ("SIP") INVITE request to the media server 112. SIP provides a method by which a media transfer session can be established between two or more devices. SIP is described in detail in the Internet Engineering Task Force Request for Comment 2543, Handley et al., March 1999, which is incorporated herein by reference in its entirety. Once a media transfer session has been initiated, the media server 112 might then send a media stream via a media transport protocol, such as RTP.

Further, the media server 112 and the wireless handset 100 might also exchange information on the media presentation capabilities of the wireless handset 100 to ensure that the media server 112 sends a compatible media sample. The media presentation capabilities of the wireless handset 100 might be based on its make and model, the presentation capabilities of applications on the wireless handset 100, or other factors.

Next at block 258, the media server 112 might send media content to the wireless handset 100. In an exemplary embodiment, the media application 166 stored in the media server's data storage 152 might send the media content. This content will, according to an exemplary embodiment, comprise one or more samples of selected media content. Each media sample will preferably be long enough to allow the user to determine whether he or she wants to receive the full media content represented by the sample. For example, one verse or thirty seconds of a song, or one screen of a video game may be transmitted. Other examples are also possible.

In one embodiment, the media server 112 might stream media samples to the wireless handset 100. Any of a variety of file streaming protocols might be used to facilitate streaming from the media server 112 to the wireless handset 100. The protocol(s) employed might depend on the type of communications link between the media server 112 and the wireless handset 100 and on how the two ends are programmed. For example, a media sample might be sent using RTP or another streaming protocol. Other examples are possible as well.

For instance, using RTP, the media server 112 might send a sequence of RTP packets representing media sample content via the communication link to the wireless handset 100. When the wireless handset 100 receives the incoming RTP packets from the media server 112, a media player 134 or other application stored in the data storage 126 of the wireless handset 100 might depacketize the packets, decode encapsulated signals, and convert the resulting digital signals into analog signals to be played out on the handset 100 using any combination of output components 130. Further, the wireless handheld 100 (or other computing device, such as the client station 108) might process the data representing the media content upon receipt and play out the analog signals as a real-time media sample.

In other embodiments, the media server 112 might send the media sample as a bulk data file, using one of several known methods of sending data (such as FTP, for instance). The wireless handset 100 might then receive the data and play it at a later time. Other methods of sending and receiving the media samples are possible as well.

Next, at block 260, the wireless handset 100 might use a data transmission protocol such as TCP/IP, or another method, to request full media content from the media server 112. This request might be responsive to the user entering into the handset 100 a selection of any file for which the user would like to receive the full media content. The user might interface with the wireless handset 100 through the handset's keypad 142 or other suitable input component 130. And the media server 112 might process the request in any of several well-known ways.

At block 262, the media server 112 might then send to the user a hyperlink for each media selection selected by the user. In an exemplary embodiment, the e-mail application 168 of the media server 112 might send an e-mail to the user containing a hyperlink for each media selection. Other examples are possible as well.

To obtain an e-mail address for the user, the media server 112 might access a user profile database 118 and look up a record for a particular user. In an exemplary embodiment, a user profile might include a user's e-mail address, and the media server 112 might send to that e-mail address a hyperlink for each full media selection selected by the user. As another example, using the keypad 142, for instance, the user might input into the wireless handset 100 a destination, such as an e-mail address, to which the media server 112 can send a hyperlink for each full media selection selected by the user. The wireless handset 100 might then send the destination to the media server 112, and the media server 112 might store the destination and an identification of the user in the data storage 154, for example. The media server 112 might then use the stored information to send to the user a hyperlink for each full media selection. In any case, in an exemplary embodiment, the email client 202 of the client station 108 might then receive the hyperlink.

At block 264, the user might invoke the hyperlink at a client station 108 other than the wireless handset 100. Further, the user might invoke the hyperlink at the user's convenience and at a client station 108 of the user's choice. For instance, one advantage of the exemplary embodiment is that a user can invoke the hyperlink at a client station 108 with advanced multimedia capabilities, thereby enhancing the user's enjoyment of a full media selection. Another advantage of the exemplary embodiment is that a user can invoke a hyperlink to a full media selection at a time or location that might make receiving the full media selection less expensive for the user. For instance, the user might invoke a hyperlink to a full media selection during a period of lower billing rates from an ISP.

In any case, according to an exemplary embodiment, user invocation of the hyperlink can cause the media server 112 to send the full media selection to the client station 108. In one embodiment, user invocation of the hyperlink might initiate an RTSP session between the client station 108 and the media server 112. The media server 112 might then stream the full media selection to the client station 108 via RTP, for example. Any of a variety of other file streaming protocols might be used instead, and the streaming protocol used might depend on the type of communication link between the client station 108 and the media server 112. In other embodiments, the media server 112 might send the full media selection to the client station 108 as a bulk data file.

According to an aspect of the exemplary embodiment, a wireless service provider might provide wireless communication service to the wireless handset. The wireless service provider might also function as an intermediary and might receive the full media content request from the wireless handset 100 and might forward the request to the media server 112. Further, the wireless service provider might perform this function as part of a service or subscription plan purchased by the user of the wireless handset 100. When receiving a request for a full media selection, the wireless provider might perform functions directed to requiring the user to pay for the full media selection to be sent to a client station 108. For example, the wireless provider might hold the request and ask for payment from the user, and might wait to receive either the payment or an agreement from the user to pay for the full media selection, before forwarding the request to the media server 112. As another example, the wireless service provider might detect the request, store information related to the request that the provider needs for billing, forward the request to the media server 112, and bill the user later for the full media selection.

In the exemplary embodiment, the hyperlink sent by the media server 112 to the client station 108 might be a limited lifetime link, in that the media server 112 will allow the user to invoke the link (and receive the full media selection) for only a limited duration of time or only a limited number of instances. Techniques for limiting the life of a hyperlink are well known in the art. For example, the media server 112 might do so by storing in its data storage 126 a timestamp of when it e-mailed the hyperlink to a user and then validating a user request for the full media selection against that timestamp. As another example, the media server 112 might timestamp and assign to a user a limited-lifetime password to use when invoking the hyperlink, and might require the user to enter a password each time the user invokes the hyperlink.

According to another aspect of the exemplary embodiment, by interaction through the client station 108 or wireless handset 100, the user might also instruct the server 112 to make the full media selection available for other designated users as well. In that instance, the media server 112 might then send an e-mail to each of the other designated users, providing each user with the limited-lifetime hyperlink. That way, the original user could share the full media selection with others. The media server 112 might limit the number of users accessing a particular hyperlink by storing, for instance, in a particular user's profile, the number of other users invoking a particular hyperlink.

5. CONCLUSION

Several exemplary embodiments of the present invention have been described above. Those skilled in the art will understand, however, that changes and modifications may be made to these embodiments without departing from the true scope and spirit of the present invention, which is defined by the claims.

I claim:

1. A media distribution method comprising:
    responsive to a first user-request, sending a media sample to a wireless handset, the media sample representing a full media selection;
    thereafter receiving from the wireless handset a second user-request for the full media selection;
    responsive to the second user-request, e-mailing to a user a hyperlink to the full media selection; and
    responsive to user invocation of the hyperlink at a client station other than the wireless handset, sending the full media selection to the client station.

2. The media distribution method of claim 1, wherein the hyperlink is a limited-lifetime hyperlink.

3. The media distribution method of claim 1, further comprising:
    a media player on the wireless handset playing the media sample to the user; and
    a media player on the client station playing the full media selection to the user.

4. The media distribution method of claim 1, further comprising, after sending the media sample to the wireless handset and before sending the full media selection to the client station:
    receiving agreement from the user to pay for the full media selection.

5. The media distribution method of claim 4, wherein a wireless service provider provides wireless communication service to the wireless handset, and wherein the wireless service provider receives the agreement to pay for the full media selection.

6. The media distribution method of claim 1, further comprising, after sending the media sample to the wireless handset and before sending the full media selection to the client station:
    receiving user payment for the full media selection.

7. The media distribution method of claim 6, wherein a wireless service provider provides wireless communication service to the wireless handset, and wherein the wireless service provider receives the user payment for the full media selection.

8. The media distribution method of claim 1, further comprising:
    receiving from the user an indication of at least one other user to receive the full media selection; and
    e-mailing to the at least-one other user the hyperlink to the full media selection.

9. The media distribution method of claim 8, wherein The hyperlink is a limited-lifetime hyperlink.

10. The media distribution method of claim 1, wherein sending a media sample to a wireless handset comprises streaming the media sample to the wireless handset.

11. The media distribution method of claim 1, wherein sending a full media selection to a client station comprises streaming the full media selection to the client station.

12. A wireless handset comprising:
    a processor;
    data storage; and
    machine language instructions stored in the data storage and executable by the processor to:

(i) responsive to a user request, receive from a media server a media sample, the media sample representing a full media selection, and (ii) responsive to a user selecting the full media selection, request the media server to e-mail to the user a hyperlink to the full media selection, such that responsive to user invocation of the hyperlink at a client station other than the wireless handset, the media server will send the full media selection to the client station.

13. The wireless handset of claim 12, wherein the hyperlink is a limited-lifetime hyperlink.

14. The wireless handset of claim 12, further comprising:
a media player stored in the data storage and being executable by the processor to play the media sample to the user.

15. The wireless handset of claim 12, wherein the machine language instructions are further executable by the processor to receive agreement from the user to pay for the full media selection.

16. The wireless handset of claim 15, wherein a wireless service provider provides wireless communication service to the wireless handset, and wherein the wireless service provider receives the agreement to pay for the full media selection.

17. The wireless handset of claim 12, wherein the machine language instructions are further executable by the processor to receive user payment for the full media selection.

18. The wireless handset of claim 17, wherein a wireless service provider provides wireless communication service to the wireless handset, and wherein the wireless service provider receives the user payment for the full media selection.

19. A media server comprising:
a processor;
data storage; and
machine language instructions stored in the data storage and executable by the processor to:
(i) responsive to a first user-request send a media sample to a wireless handset, the media sample representing a full media selection,
(ii) thereafter receive from the wireless handset a second user-request for the full media selection,
(iii) responsive to the second user-request, e-mail to a user a hyperlink to the full media selection, and
(iv) responsive to user invocation of the hyperlink at a client station other than the wireless handset, send the full media selection to the client station.

20. The media server of claim 19, wherein the hyperlink is a limited-lifetime hyperlink.

21. The media server of claim 19, further comprising:
a media application stored in the data storage and being executable by the processor to send the full media selection to the user.

22. The media server of claim 19, wherein the machine language instructions are further executable by the processor to:
receive from a user an indication of at least one other user to receive the full media selection; and
e-mail to the at least-one other user the hyperlink to the full media selection.

23. The media server of claim 22, wherein the hyperlink is a limited-lifetime hyperlink.

24. A system comprising:
a wireless handset; and
a media server; and
wherein The wireless handset comprises a processor, data storage, and machine language instructions stored in the data storage and executable by the processor to (i) receive, responsive to a first user-request, from the media server a media sample, the media sample representing a full media selection; and (ii) request the media server to e-mail to a user a hyperlink to the full media selection; and herein the media server comprises a processor, data storage, and machine language instructions stored in the data storage and executable by the processor to (i) send a media sample to the wireless handset, the media sample representing a full media selection; (ii) responsive to a second user-request from the wireless handset for the full media selection, e-mail to a user a hyperlink to the full media selection; and (iii) responsive to user invocation of the hyperlink at a client station other than the wireless handset the full media selection to the client station.

25. A wireless handset comprising:
a means for receiving from a media server, responsive to a user request, a media sample, the media sample representing a full media selection; and
a means for requesting the media server to e-mail to a user a hyperlink to the full media selection, such that responsive to user invocation of the hyperlink at a client station other than the wireless handset, the media server will send the full media selection to the client station.

26. A media sewer comprising:
a means for sending a media sample to a wireless handset responsive to a first user-request, the media sample representing a full media selection;
a means for receiving from the wireless handset a second user-request for the full media selection;
a means for e-mailing to a user a hyperlink to the full media selection in response to the second user-request; and
a means for sending the full media selection to a client station other than the wireless handset in response to user invocation of the hyperlink at the client station.

27. A system comprising:
a means for sending a media sample to a wireless handset responsive to a first user-request, the media sample representing a full media selection;
a means for receiving from a media server the media sample;
a means for requesting the media server to e-mail to a user a hyperlink to the full media selection;
responsive to a second user-request from the wireless handset for the full media selection, a means for e-mailing to the user the hyperlink to the full media selection; and
responsive to user invocation of the hyperlink at a client station other than the wireless handset, a means for sending the full media selection to the client station.

* * * * *